United States Patent [19]

Pangerl

[11] Patent Number: 5,347,867
[45] Date of Patent: Sep. 20, 1994

[54] ACCELEROMETER INCORPORATING A DRIVEN SHIELD

[75] Inventor: Michael A. Pangerl, Crystal, Minn.

[73] Assignee: Minnetonka Warehouse Supply, Inc, Minnetonka, Minn.

[21] Appl. No.: 12,866

[22] Filed: Feb. 3, 1993

[51] Int. Cl.⁵ ............................................. G01P 15/125
[52] U.S. Cl. .................. 73/517 R; 29/25.41; 73/518; 361/280
[58] Field of Search ............ 73/517 R, 518, 116; 361/280; 364/426.01, 426.02, 426.03, 426.04, 426.05; 29/25.41

[56] References Cited

U.S. PATENT DOCUMENTS

| | | | |
|---|---|---|---|
| 4,435,737 | 3/1984 | Colton | 73/517 R |
| 4,694,687 | 9/1987 | Bonin et al. | 73/116 |
| 5,205,171 | 4/1993 | O'Brien et al. | 73/517 R |
| 5,216,490 | 6/1993 | Greiff et al. | 73/517 R |

*Primary Examiner*—Donald Woodiel
*Attorney, Agent, or Firm*—Haugen and Nikolai

[57] ABSTRACT

An accelerometer implementing a capacitive transducer, including circuitry for reducing the effective loading capacitance on a movable vane. The capacitive transducer includes a pair of shields, including an inner shield driven by the output of a unity gain amplifier which is coupled to the movable vane, and a second outer grounded shield isolated from and encompassing both the driven shield and the capacitive transducer. Thus, the accelerometer reduces both the effective parasitic loading capacitance by taking advantage of the well-known Miller theorem, while implementing a second grounded shield without affecting the parasitic loading capacitance to reduce EMI. A more linear capacitive based accelerometer is realized which can be practically implemented in vehicles, including vehicle performance analyzers used in automobiles for detecting changes in G-forces experienced during acceleration and deceleration of the vehicle.

5 Claims, 3 Drawing Sheets

ACCELEROMETER INCORPORATING A DRIVEN SHIELD

BACKGROUND OF THE INVENTION

I. Field of the Invention

This invention relates generally to a capacitive transducer apparatus, and more particularly to an accelerometer circuit incorporating a capacitive transducer having a more linear output by reducing the effective parasitic loading capacitance and reducing electromagnetic interference (EMI).

II. Discussion of the Prior Art

Capacitive transducers have numerous uses, such as in a vehicle performance analyzer for detecting changes in G-forces and producing a digital count value proportional to such changes, as described in U.S. Pat. No. 4,694,687 to Bonin et al. incorporated herein by reference. The performance analyzer as taught by Bonin et al. teaches a transducer device comprising first and second pairs of G-force responsive, serially-connected variable capacitors. The transducer device produces output electrical signals proportional to the G-forces experienced by the vehicle in which the performance analyzer is mounted.

There are several problems to be overcome when using presently known capacitive transducers as sensors in a vehicle performance analyzer. Namely, sensors incorporating capacitive transducers have nonlinear characteristics which adversely effect the accuracy of the performance analyzer. This nonlinear characteristic is caused in part by parasitic loading capacitances which are inherent in capacitive transducers in general, and specifically capacitive accelerometers. Such loading capacitance is due to capacitive effects between the output of the transducer devices and other electrical components to which they are coupled, as well as device packaging. A further problem of using capacitive transducers is that their performance is adversely affected by EMI interference generated by adjacent devices, such as electrical components or the engine of a vehicle. While prior efforts have individually attempted to reduce parasitic capacitances or EMI interference, prior art capacitive accelerometers fail to simultaneously reduce both problems.

Referring to FIG. 1, an electrical representation of a prior art capacitive transducer is shown with a grounded shield, and parasitic capacitance represented as $C_L$ which exists between the transducer output and ground. The parasitic capacitance $C_L$ exists between the movable vane or plate and the external environment. Prior art accelerometers typically have a parasitic capacitance $C_L$ equaling 2 pF. Absent any loading parasitic capacitance on the connection between the movable vane and subsequent circuitry, a perfectly linear accelerometer would be obtained.

Since removing parasitic capacitances entirely is impossible, efforts to reduce the effect of the parasitic loading capacitance on the accuracy and linearization of the capacitive accelerometer would be appreciated by one of ordinary skill in the art. Further, an accelerometer including a capacitive transducer which reduces the EMI, which can degrade the accuracy of the sensor, using a practical design would be appreciated as well.

OBJECTS

It is accordingly a principal object of the present invention to provide an accelerometer including a circuit having a capacitive transducer which reduces the effective parasitic loading capacitance to provide a more linear sensor having an output proportional to the G-forces experienced by the vehicle.

Still another object of the present invention is to provide an accelerometer including an improved capacitive transducer which reduces EMI from degrading the performance of the sensor circuit.

Still yet another object of the present invention is to provide a neatly packaged capacitive transducer which facilitates both of these desired objectives.

These and other objects and advantages of the present invention will become apparent to those skilled in the art from the following detailed Description of a Preferred Embodiment, especially when considered in conjunction with the accompanying drawings in which like numerals in the several views referred to corresponding parts.

SUMMARY OF THE INVENTION

The present invention comprises a more linear accelerometer having a capacitive transducer for sensing acceleration and deceleration forces by reducing both the effective parasitic loading capacitance and EMI. The present invention is realized by connecting a unity gain amplifier to the movable plate or vane of a capacitive transducer, and driving a first inner shield to take advantage of the well-known Miller Effect thus reducing the effective parasitic loading capacitance. Further, a second outer shield integral to the capacitive transducer encompasses the first shield and is grounded to reduce EMI. Thus, both inherent problems of accelerometers using capacitive transducers are reduced using the improved transducer of the present invention.

The invention comprises a capacitive accelerometer circuit comprising a capacitive transducer for sensing acceleration and deceleration forces and producing electrical signals proportional to the forces. The transducer comprises a first and second non-conductive stationary plate with a movable conductive plate disposed therebetween to form a pair of serially connected variable capacitors. Both the first and second non-conductive plates have an electrode on an inner surface and proximate the movable plate to form a first plate of a capacitor, wherein each first and second plate also has a conductive shield on the opposite outer surface of the stationary plate, and which are electrically isolated from the respective electrodes are grounded. When an excitation voltage, such as an AC signal, is applied across the electrodes of the first and second stationary plates, an amplitude modulated electrical signal is produced upon the movable plate due to the varying capacitance between the movable plate and each of the electrodes. The invention further comprises an amplifier having a unity gain having an input coupled to the movable plate, wherein the output is coupled to each of the first shields of the first and second stationary plates to reduce the effective parasitic capacitance on the movable plate by taking advantage of the Miller Effect. Each of the grounded conductive shields on the outer surfaces of each of the first and second stationary plates provide a shield reducing EMI on the movable plate. The novel accelerometer thus reduces both EMI and the effective parasitic loading capacitance on the movable plate. The excitation voltage is preferably provided by an electrical oscillator, operating at a preferred frequency of between 50 Khz and 90 Khz.

DESCRIPTION OF THE PREFERRED EMBODIMENT

Figure 1:
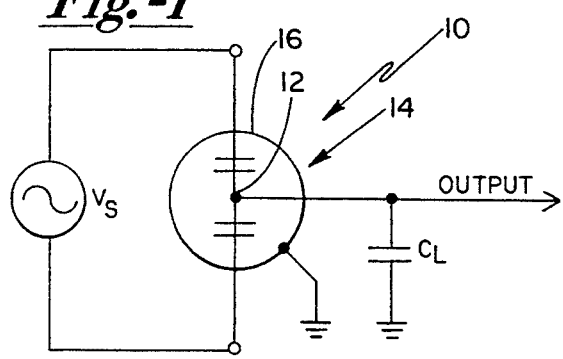
FIG. 1 is an equivalent electrical representation of a prior art capacitive transducer circuit having a grounded shield with parasitic loading capacitance $C_L$ existing between the movable vane or plate and ground.

Referring now to FIG. 1, a schematic representation of a basic prior art capacitive accelerometer 10 is illustrated. As shown, a parasitic loading capacitance, represented as $C_L$, exists between a movable plate 12 of a capacitive transducer 14 and ground which degrades the linear response of the accelerometer 10. Regardless of how proximate subsequent processing circuitry is located to the movable plate 12, parasitic loading capacitance $C_L$ will always exist. Grounding a single shield 16 encasing the capacitive transducer 14 helps reduce EMI. Turning now to the present invention, an accelerometer implementing in a circuit which reduces both the effective parasitic loading capacitance and EMI using a capacitive accelerometer will be discussed.

Figure 2:
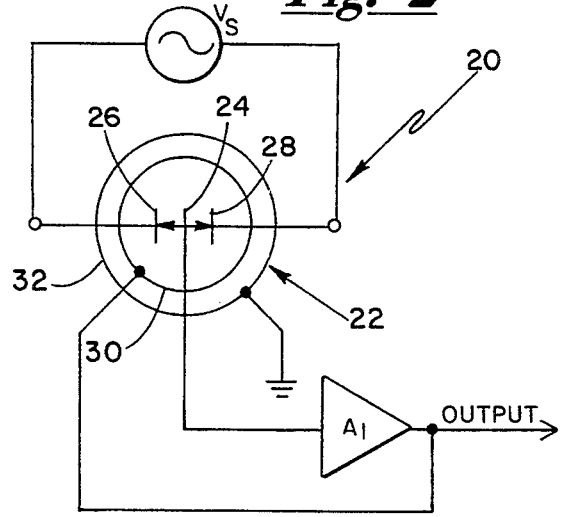
FIG. 2 is an electrical block diagram of an accelerometer according to the present invention implementing a unity gain amplifier driving an inner first shield of a capacitive transducer, and having a grounded second outer shield.

Referring to FIG. 2, a detailed electrical block diagram of the accelerometer according to the present invention is illustrated at 20. Accelerometer 20 includes a capacitive transducer 22 having a movable conductive plate 24 disposed between a pair of stationary conductive plates 26 and 28 to form a pair of serially-connected capacitors. An excitation signal, represented as $V_s$, provides an oscillating voltage signal across stationary plates 26 and 28, which in turn is coupled across each of the formed variable capacitors to movable plate 24. Capacitive transducer 22 thus produces amplitude modulated electrical signals on movable plate 24 which are proportional to acceleration and deceleration forces experienced by transducer 22, such as when installed on a vehicle. Basic capacitive transducers as described so far are well-known in the art for obtaining a signal representative of acceleration and deceleration forces of vehicles, as taught by U.S. Pat. No. 4,694,687 incorporated herein by reference.

Still referring to FIG. 2, the improved capacitive transducer and novel circuitry according to the preferred embodiment of the present invention will now be discussed in considerable detail. First, a unity gain amplifier $A_1$ has an input coupled to movable plate 24. The output of amplifier $A_1$ is coupled back to a first inner conductive shield 30 which encompasses, but is electrically isolated from, each of plates 24, 26 and 28. This circuitry takes advantage of the well-known Miller Effect to reduce the effective loading capacitance on movable plate 24.

Figure 3:
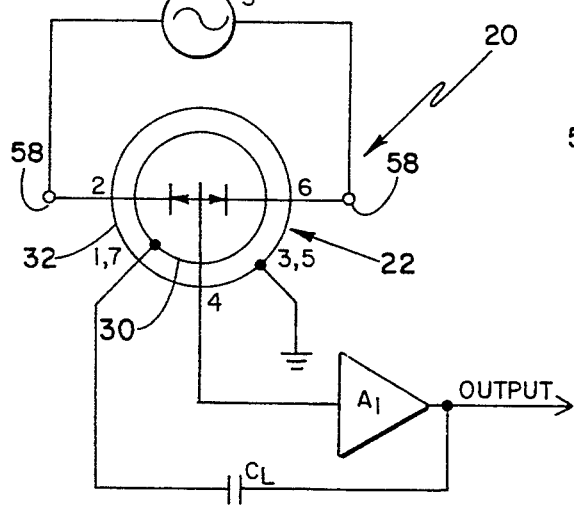
FIG. 3 is an equivalent electrical block diagram of the invention shown in FIG. 2 illustrating the inherent parasitic loading capacitance represented as $C_L$ existing between the transducer output and the first inner shield.

Referring to FIG. 3, a parasitic loading capacitance $C_L$ is shown which results from driving the first inner shield and encompassing the plates. Using the well-known Miller Effect Theorem, the effective parasitic loading capacitance on movable plate 24, represented as $C'_L$, can be represented as follows:

$$C'_L = (1-K)C_L$$

Figure 4:
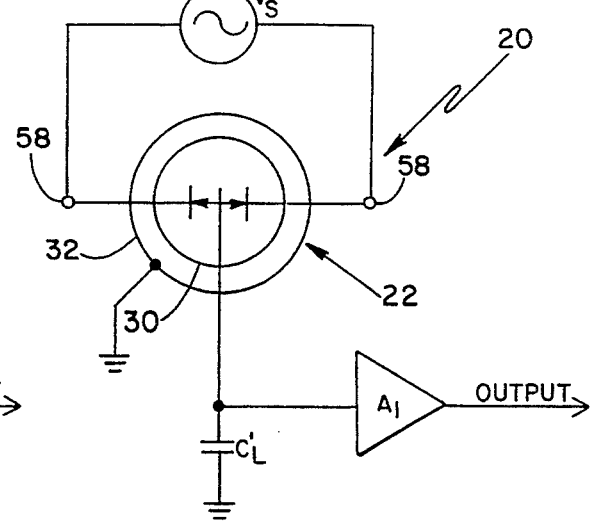
FIG. 4 which illustrates the reduced effective parasitic loading capacitance represented as $C'_L$ which exists upon the movable plate according to the present invention.

This effective parasitic loading capacitance $C'_L$ is illustrated in FIG. 4. If, for example, $C_L$ is about 2 pF, as assumed with reference to the prior art transducer shown in FIG. 1, and K represents the gain of amplifier $A_1$ that approaches unity (e.g. K=0.99) than the value of $C'_L = 0.02$ pF. Thus, the implementation of amplifier $A_1$ in the present invention reduces the effects of capacitive loading on the transducer by a factor of about 100 in this example. Thus, taken advantage of the well-known Miller theorem, the circuit shown in FIG. 2 reduces the effective parasitic loading capacitance upon movable plate 24 to realize the more linear capacitive transducer 22.

Secondly, the present invention also reduces EMI from degrading the performance of transducer 22 by providing a second grounded conductive shield 32 which encompasses, but is electrically isolated from, the first inner shield 30, as shown in FIG. 2, without further increasing the parasitic loading capacitance existing on movable plate 24. By providing a pair of shields, wherein the inner shield is driven by the output of a unity gain amplifier coupled to the movable plate, and the outer shield encompassing the first inner shield is grounded, the present invention realizes both of the desired features. Namely, reducing the effective parasitic loading capacitance on the movable vane or center plate 24, and reducing EMI from degrading the performance of the accelerometer 20.

Wherein prior art devices have only provided a grounded shield encompassing the capacitive transducer to reduce EMI, and failed to provide a separate enclosed shield which is driven by a unity gain amplifier to take advantage of the Miller Effect to reduce parasitic loading capacitance, the present invention achieves both goals by implementing a novel capacitive transducer as will now be discussed in considerable detail.

Figure 5:
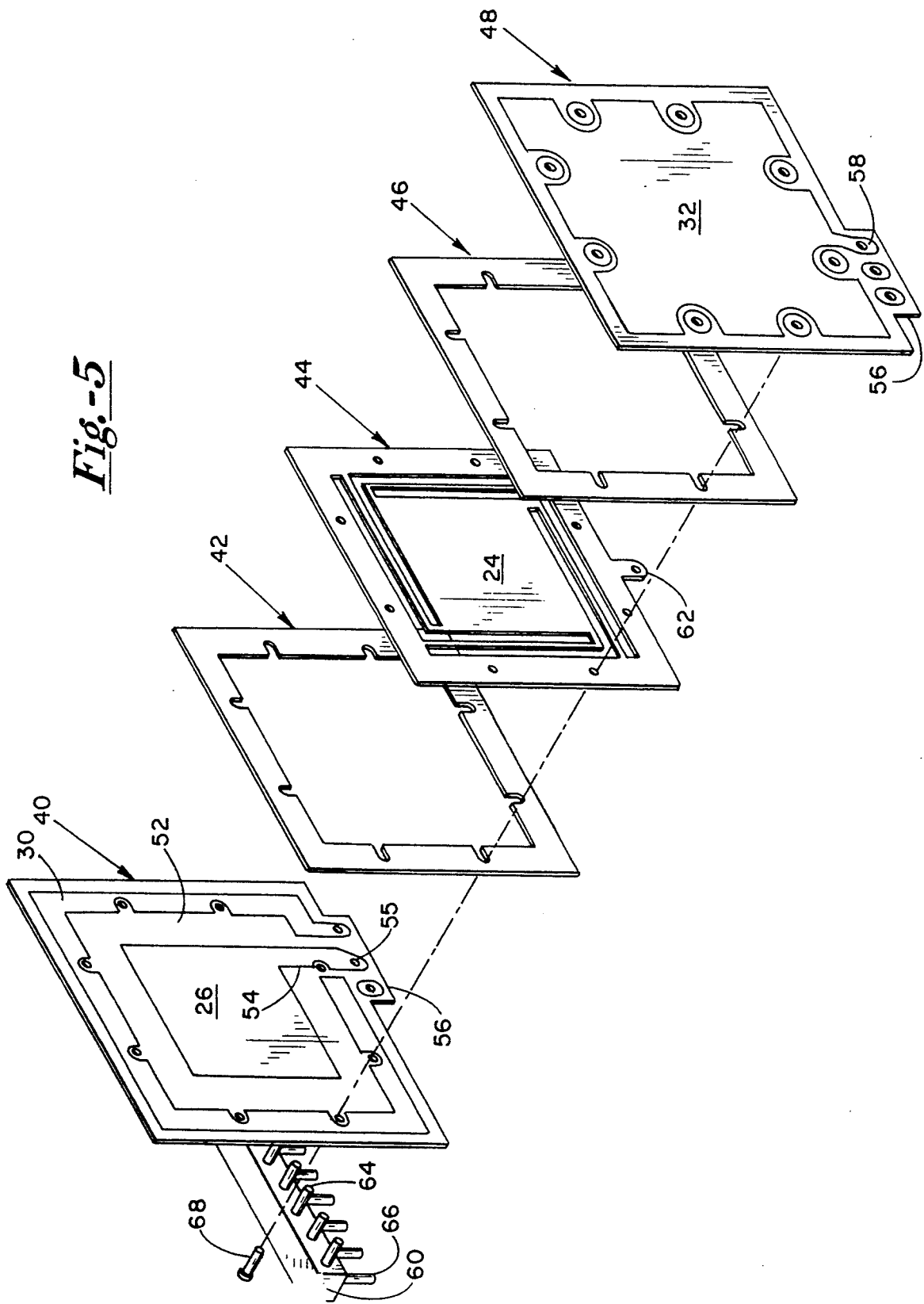
FIG. 5 represents an exploded perspective view of a capacitive transducer according to the present invention including a pair of shields encompassing the capacitor plates to reduce the effective parasitic loading capacitances, and EMI.

Referring to FIG. 5 an exploded perspective view of capacitive transducer 22 is shown. Transducer 22 is fabricated using well-known printed circuit etching techniques. More particularly, it comprises a laminated configuration of four non-conductive layers 40, 42, 46 and 48, and a conductive layer 44 which is shown in exploded form in the figure. The outer exposed surfaces of both substrate 40 and 48 are covered with metalization, for example, tin-plated copper, and are grounded via a connector 60 such that the metal layers together shield the enclosed capacitor plates from EMI.

Both the inner surfaces of the layers 40 and 48 are identical and have a metalized pattern corresponding closely to what can be seen on the substrate 40. More particularly, the metalization comprises a generally rectangular frame pattern forming inner shield 30, which shield extends around the periphery of the substrate and defining an unmetalized opening 52. Centrally disposed in this opening is a rectangular pattern of conductive material forming an electrode, which electrode forms a first plate of the pair of capacitors represented as plates 26 and 28, schematically shown in FIG. 2. Plates 26 and 28 each have a conductive lead 54 leading to a central pad 55 of a terminal portion 56.

Figure 6:
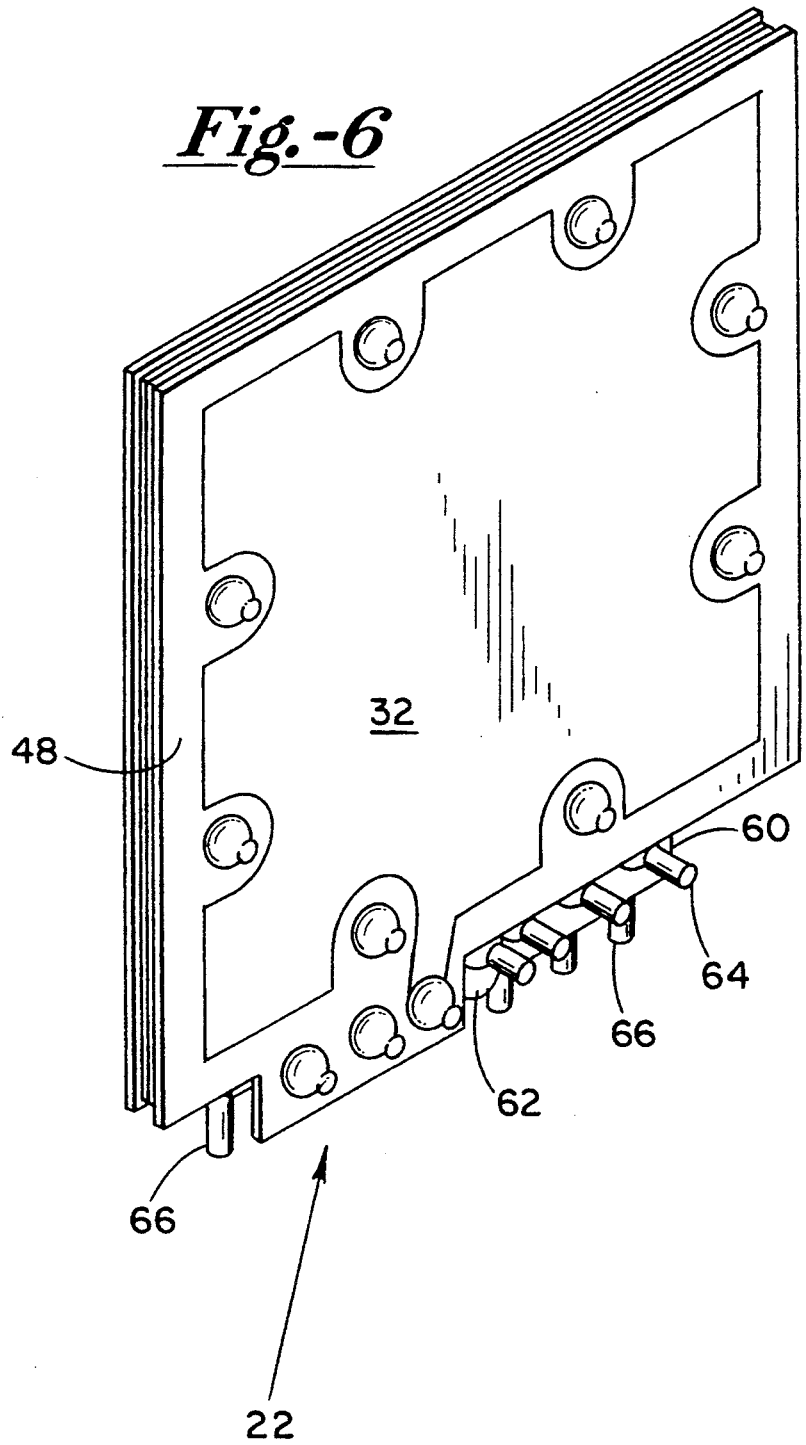
FIG. 6 is a perspective view of the assembled capacitive transducer including the 7-pin connector.

Substrates 40 and 48 are identical, wherein the pattern of metalization shown on substrate 40 and that contained on the underside of substrate 48 is identical to one another. The metalization patterns are disposed to face each other such that the terminal portions 56 of each substrate are offset from one another, rather than vertically aligned, to facilitate a 7-pad terminal portion for connector 60 as shown in FIG. 6, wherein the pads and connections are numbered for reference as shown in FIG. 3. Substrate 42 and 46 are each spacer layers comprised of non-conductive material and have a generally rectangular opening formed centrally therein, the opening extending completely through the respective substrate. Sandwiched between layers 42 and 46 is a central conductive substrate 44 having an etched copper layer supported by spring elements, defined by a pattern of slits extending through the thickness dimension of layer 44 and surrounding a solid segment or vane 24 which forms the movable plate, which plate forms the second plate for both variable capacitors. Because of the manner in which the slits are positioned, the central mass or movable vane 24 is effectively supported by the surrounding framework by narrow strips which function as leaf spring supporting the movable vane 24.

The thickness of layers 42 and 46 are identical, and define the thickness of the dielectric (air) between the plates 26 and 28 from movable plate 24. A smaller spacing distance between plates facilitates creating capacitors of higher accuracies, but larger spacing distances are required for transducers used for larger G-force applications. For instance, a thickness dimension of substrates 42 and 46 of 5 mils. is used for 5 G range applications, and a dimension of 10 mils. is used for 10 G range applications. Nomex is a preferred material for substrate-spacer layers 42 and 46 due to the highly accurate tolerances that can be obtained. However, limitation to the dimensions or materials of substrates 42 and 46 is not to be inferred.

Accelerometer 20 is distinguishable and superior to the device taught in U.S. Pat. 4,694,687 since each inner shield 30 defined on the inner surface of each substrate 40 and 48 are driven by the output of amplifier $A_1$, as shown in FIG. 2, and are electrically isolated from exterior grounded shields 32. Each of the outer grounded shields 32 of each substrate 40 and 48, which are defined on the outer surface of each respective substrate, are grounded via the innermost terminal pad 58 of respective terminal portion 56 of each respective substrate. Terminal portion 56 of each substrate 40 and 48 is electrically coupled to a 7-pin connector 60 as shown for facilitating inputs and outputs to each of the shields 30 and 32, stationary plates 26 and 28, and movable vane 24. The center pin of connector 60 couples output signals from vane 24 via a pad or terminal portion 62 extending from substrate 44 between the terminal portions 56 of substrates 40 and 48. The pin numbering of the seven pins of connector 60 to each of the respective terminal portions 56 and 62 is shown in FIG. 3. An assembled transducer 22 is illustrated in FIG. 6, wherein plurality of rivets 68 extend through the substrates, and are electrically isolated from the shields and capacitor plates to secure the substrates together. A plurality of pins 64 extend from connector 60 through, and are electrically coupled to, the respective terminal pads defined on the respective terminal portions 56 and 62 of each of the substrates. Pins 66 are electrically connected to respective pins 64.

Each substrate 40 and 48 are comprised of a rigid non-conductive material which is less subject to dimensional changes due to temperature fluctuations, such as material commonly known as FR-4 or FR-5. Thus, an accurate transducer which is less affected by temperature changes is realized. Inner shield 30 is driven by the output of amplifier $A_1$ to take advantage of the Miller Effect and reduce the effective parasitic loading capacitance as previously described. The outer shield 32 of each substrate 40 and 48 is grounded via the terminal portion 56, as schematically shown in FIG. 2. While driving the inner shield 30, and grounding the outer shield 32, parasitic loading capacitance is not increased, yet EMI is reduced, as is the effective loading parasitic capacitance. Since the grounded shield provided by shields 32 are disposed on the outer surface of each respective substrate 40 and 48, the driven shield is electrically isolated therefrom. This arrangement further reduces the effective loading parasitic capacitance on a movable vane 24.

In summary, the present circuit coupled to the unique capacitive transducer serves two purposes in a compact arrangement. First, the effective parasitic loading capacitance on a movable vane 24 is reduced thus improving the linear response of accelerometer 20. Secondly, accelerometer 20 has a higher quality output signal when shielding both the inner driven shield and the capacitive transducer. The combination of the present circuit with the disclosed capacitive transducer realizes a unique accelerometer which can be implemented in harsh environments, including vehicle performance analyzers.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

In the claims:

I claim:

1. A capacitive accelerometer, comprising:
   (a) capacitive transducer means for sensing acceleration and deceleration forces and producing electrical signals proportional to said forces, said transducer means comprising a first and second non-conductive stationary plate and a movable conductive plate disposed therebetween movable in relation to said first and second stationary plates in response to said forces, each said first and second plate having an electrode disposed on an inner surface proximate said movable conductive plate and a conductive grounded shield disposed on an opposite outer surface, said first and second plates each having a first shield disposed around said respective electrode, but electrically isolated from the respective electrode and said conductive shields, wherein the electrical signals produced are emitted from the movable conductive plate; and (b) amplifier means having an input coupled to said movable conductive plate for providing a gain of about unity, and an output coupled to each said first shield of said first and second stationary plates.

2. The accelerometer as specified in claim 1 further comprising means for applying an excitation voltage signal across said electrodes of each said first and second stationary plates, wherein the excitation voltage produces an amplitude modulated signal as the electrical signal on said movable conductive plate as a result of movement of the movable conductive plate.

3. The accelerometer as specified in claim 2 wherein said excitation voltage means comprises an electrical oscillator.

4. The accelerometer as specified in claim 3 wherein said electrical oscillator oscillates at a fixed frequency between about 50 Khz and 90 Khz.

5. The accelerometer as specified in claim 1 wherein said first and second plates each comprise of FR-4 material.

* * * * *